United States Patent Office  3,470,136
Patented Sept. 30, 1969

3,470,136
WATER-SOLUBLE POLYESTERS CONTAINING ALKYLENEPOLYAMINE GROUPS
Jack C. McClendon and Clarence R. Dick, Lake Jackson, Tex., assignors to The Dow Chemical Company, Midland, Mich., a corporation of Delaware
No Drawing. Filed Feb. 24, 1966, Ser. No. 529,676
Int. Cl. C08g *17/14*
U.S. Cl. 260—75                                    5 Claims

ABSTRACT OF THE DISCLOSURE

Polymers containing acryloxy groups in either main or side chain are reacted with aziridines unsubstituted at the nitrogen atom to give B-substituted aziridine group containing polymers. When these are formed from polyesters containing major amounts of unsaturated dibasic acids, a water soluble polymer results, which is lightly cross-linked by heating in acidic solution to give water-soluble polymers effective as flocculating agents.

---

This invention relates to a process for preparing water-soluble polyester resins containing alkylenepolyamine groups and to the resins so produced. The polymers of this invention and compositions containing a preponderance of the polymers disclosed herein are useful as flocculating agents. The water-soluble polyester resins of this invention are prepared in the cross-linked form by heating a water solution of linear polyesters containing 1-aziridinyl groups for a sufficient time to cause cross-linking by forming alkylenepolyamine groups from the 1-aziridinyl groups.

Polyester resins containing residues of unsaturated polycarboxylic acids, such as maleic, fumaric, itaconic, citraconic or glutaconic acid, are well known. These contain olefinic double bonds in the polymer chain.

The present invention is concerned with unsaturated polyester resins wherein their olefinic double bonds are activated by adjacent carboxy groups; that is, those containing the group

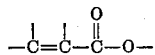

For convenience, such groups will be referred to hereinafter as acryloxy groups because the prototype thereof is derived from acrylic acid

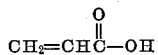

According to the present invention, polyester resins containing acryloxy groups can be cross-linked and beneficially modified by a two-step process as follows:

(1) At least some of the acryloxy groups are reacted with an aziridine, whereby an aziridinyl group becomes attached to the acryloxy group:

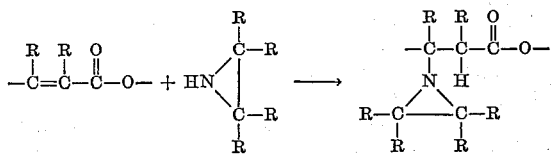

(2) At least some of the aziridine groups are homopolymerized, thus cross-linking the resin through the aziridine groups.

It is to be understood that in all the formulas herein, each R represents an inert monovalent radical, such as H, alkyl or phenyl. Any such alkyl radicals ordinarily contain not more than about 6, and preferably not more than 2 carbon atoms. Also, it is preferred that on the aziridine ring at least two R's be hydrogen and not more than one be phenyl. It is to be further understood that while the above formulas illustrate the acryloxy group as being an integral part of the "backbone" or main chain of the polymer, it can also be a side-chain, or a part of a side-chain. Also, it can be partially main-chain and partially side-chain. Side-chain acryloxy groups may be illustrated by structures, such as (a)      —CR—
          |
          OCOCR=CR₂

(b)      —CR—
          |
          OCOCR=CRCOOR and the like, wherein the long dashes represent the main chain of the polymer. Partial side-chain acryloxy groups may be illustrated by structures such as (c)  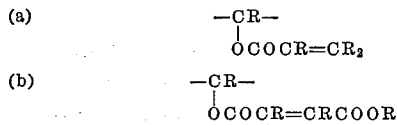

(d)  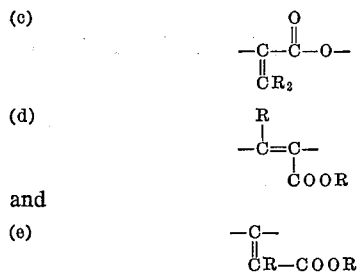

and (e)       —C—
           ||
           CR—COOR

The structure (a) is easily prepared by the reaction of acrylic acid, acrylic anhydride or equivalent, with any polymer having esterifiable hydroxyl groups. Similarly, (b) can be made by esterifying such hydroxyl-bearing polymers with maleic or fumaric acid or a half-ester of such acid. Polymers of the structure (c) are obtained by using itaconic acid in making a linear polyester. Polymers containing the structure (d) can be made by the dehydrohalogenation of a poly(alpha-haloacrylate). The structure (e) can be produced by condensing a polymer containing aldehyde or ketone groups with an ester of acetic, malonic or propionic acid. Conversely, it can be made by condensing an ester of glyoxylic, pyruvic or acetonedicarboxylic acid with a polymer containing active methylene groups.

Having the benefit of the concepts disclosed herein, those skilled in the art will be able to provide polyesters having the above and other equivalent structures.

The addition of aziridine compounds, such as ethylenimine, to certain unsaturated polyesters of the above-defined type has been reported by Huttel et al., Farbe und Lack, 67, 71, 1961. Huttel also described the cross-linking of the aziridinyl resins by treatment with alkyl arylsulfonates. The reaction involved in the latter process is the homopolymerization of the aziridinyl groups and is catalyzed by the sulfonate. Unlike the present invention, Huttel's cross-linking process produced substantially water-insoluble cross-linked resins. The cross-linking is produced by a curing process, and the resulting resins are useful primarily as chemically inactive coatings.

For the purpose of this invention, the term "water-soluble" may be defined as capable of forming at least a 0.1 percent by weight visually continuous solution in water at 25° C.

According to the present invention, aziridinyl polyester resins, that is, polyester resins to which are attached a plurality of 1-aziridinyl groups, are cross linked through the aziridinyl groups by heating a water solution of such polyesters for a sufficient time to cause crosslinking through the formation of alkylenepolyamine groups. No catalyst is necessary to cause such cross-linking in water. An acid catalyst may be used with no apparent difference in the resulting cross-linked polymers, thus allowing shorter reaction times and/or lower reaction temperatures.

The chemical reactions involved in the practice of this invention are not fully understood, but it is believed that the principal reaction is analogous to the polymerization reaction for most N-substituted aziridines. While the structure illustrated below is idealized and is not intended to portray the compositions actually produced, the principal reaction believed to be involved in the present invention can be illustrated as follows:

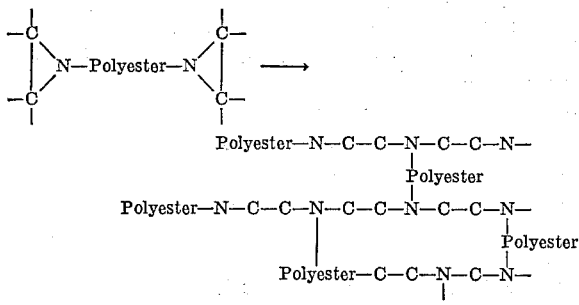

Alternatively, the product may be visualized as follows:

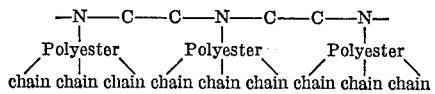

Attempts to isolate the water-soluble cross-linked polymers from their aqueous solutions have been unsuccessful. The material isolated is apparently cross linked to a higher degree by the separation process, and is thus incapable of being redissolved in water.

The preparation of the intermediate polyaziridinyl resins from which the water-soluble, cross-linked polyesters of the present invention are prepared is conveniently carried out by a two-stage process: (1) preparation of the unsaturated polyester resin, and (2) conversion of this resin to the polyaziridinyl resin by reaction with an aziridine compound. The present invention concerns a third step, wherein the polyaziridinyl resin is cross linked through the aziridinyl group, thus producing a water-soluble polyester resin containing alkylenepolyamine groups.

UNSATURATED POLYESTER RESIN

As pointed out hereinbefore, suitable unsaturated polyester resins are commercially available or can be made by known methods. The requisite unsaturation must be in the form of double bonds which are activated by adjacent carboxy groups, that is, in the form of acryloxy groups as herein defined. Such groups are conveniently provided by unsaturated acids such as maleic, fumaric, itaconic, citraconic, chloromaleic and glutaconic acid or the corresponding anhydride, or the like. It is not necessary that all of the polycarboxylic acid component of the polyester resin be unsaturated. A sufficient frequency of acryloxy groups is provided if at least about 25 mole percent, and preferably at least about 50 mole percent of the total acid is of the type to provide acryloxy groups. The remainder may be any saturated, unsaturated or aromatic polycarboxylic acid that is useful in making polyester resins, such as for instance, phthalic, succinic, adipic or sebacic acid, dimerized fatty acid, or the like.

The polyol component of the polyester resin may be of any of those useful in making polyester resins. Among the commonly used ones are ethylene, propylene, butylene, hexylene, diethylene, dipropylene, polyethylene and polypropylene glycols, glycerol, the bis(2-hydroxyalkyl)ethers of bisphenol A and halogenated bisphenol A, and the like.

Methods for esterifying the above acids and polyols are well known in the art and are disclosed, for example, in Bjorksten et al., Polyesters and Their Applications (Reinhold, 1956), pp. 40 ff.

AZIRIDINYL POLYESTER RESINS

Aziridine compounds such as ethylenimine and its homologs and analogs having a hydrogen on the nitrogen atom of the aziridine ring readily react on contact, even at ordinary temperatures, with unsaturated polyester resins containing acryloxy groups. In this reaction the aziridine moiety becomes attached through its nitrogen atom to the beta-carbon atom of the acryloxy group, thus converting the latter to a beta-aziridinyl-propionoxy group. Since the polyester usually contains residual acid groups, which groups will not only react with the aziridine compounds but also catalyze polymerization of the aziridine compounds, it is desirable to make certain that all such acidity is neutralized before contacting the resin with the aziridine compound. This is conveniently done by the addition of a tertiary amine. The trialkylamines are preferred, especially those wherein the alkyl radicals contain not more than 4 carbon atoms, for example, triethylamine and tributylamine. Amines also catalyze the reaction of the aziridine compound with the unsaturated polyester; hence it is convenient and preferable to add to the polyester, prior to adding the aziridine compound, an excess of tertiary amine over the amount required to neutralize any residual acidity. The amount of such excess is not critical, an amount of the order of 1 to 25 percent by weight, polyester basis, being sufficient.

The aziridine compound is suitably added to the polyester at a slow rate and with adequate stirring and, if necessary, cooling to dissipate the exotherm, since the reaction is exothermic and overheating results in darkening of the product and may even result in uncontrolled cross-linkage. It is preferred to dissolve either the polyester or the aziridine compound, and preferably both, in an inert, anhydrous, volatile solvent, for example, methylethyl ketone, toluene, or tetrahydrofuran, thus facilitating mixing and temperature control.

It has been found generally preferable to use at least the amount of the aziridine compound theoretically required to react with all the acryloxy groups in the polyester. Up to about 50 percent excess may be advantageously used, though usually about 25 to 40 percent excess is preferred. To assure complete reaction, the mixture may be gently heated, as for example, at 50–100° C. for an hour.

CROSS LINKING THE AZIRIDINYL POLYESTER RESIN

In practicing the invention, the aziridinyl polyester resin is heated in solution in water. The cross linking reaction may be carried out at any desired ratio of the polyester to water. Preferably, from about 5 weight percent to about 40 weight percent polyester in water is used. Best results are obtained with from about 5 weight percent to 20 weight percent polyester. If less than a 5 weight percent solution is used, the cross-linked polyester does not have a very high molecular. If more than 20 weight percent of the polyester is used, the cross-linked polyester may reach such a high molecular weight that it is not readily water soluble.

The cross-linking reaction is dependent on both time and temperature. The preferred temperature range is from about 25° C. to about 50° C. Higher temperature would risk hydrolysis of the polyester. The time will, of course, vary with the temperature. Reaction times of from about ½ hour to about 4½ hours have been found advantageous. The preferred time for cross linking is 2½ hours at 25° C. and 1 hour at 50° C. If longer times are used, hydrolysis of the polyester or the formation of insoluble polymers will result.

A catalyst is not necessary for the cross linking. Suitable mineral or organic acid catalysts may be employed, if desired, with no apparent difference in the resulting polymers. Examples of suitable catalysts are carbonic acid, hydrochloric acid, and nitric acid, with hydrochloric acid and carbonic acid being preferred. At least a catalytic amount is used, generally from 0.01 to 0.10 weight percent, based on the amount of aziridinyl polyester. The use of such acid catalysts permits shorter reaction times and/or lower reaction temperatures.

The table shows the number of moles of polycarboxylic acids or anhydrides and of glycols or polyols used in making the unsaturated polyester resin containing acryloxy groups and the mols of ethylenimine or propylenimine added to the unsaturated resin, thus forming the aziridinyl polyesters.

TABLE I

| Polyester No. | Aziridinyl resin compositions |||||||||||||
|---|---|---|---|---|---|---|---|---|---|---|---|---|---|
| | 1 | 2 | 3 | 4 | 5 | 6 | 7 | 8 | 9 | 10 | 11 | 12 | 13 |
| Maleic anhydride | 1.0 | 1.0 | 1.0 | 1.0 | 1.0 | 1.0 | 1.0 | 1.0 | 1.0 | 1.0 | 1.0 | 1.0 | |
| Itaconic acid | | | | | | | | | | | | | 1.0 |
| Oxalic acid | | | | | | | | | | | 1.0 | | |
| Empol 1014 [1] | | | | | | | | 0.5 | | | | | |
| Adipic acid | | | | | 1.0 | 0.5 | | | 0.5 | | | 0.5 | |
| Phthalic anhydride | | | | | | 0.5 | | 0.5 | 0.5 | | | 0.5 | |
| Ethylene glycol | 1.1 | | | | 2.2 | 1.1 | | 0.8 | 0.8 | 1.1 | 1.1 | | |
| Diethylene glycol | | 1.1 | | | | | | 0.2 | | | | | |
| E-200 [2] | | | 1.1 | | | | | | | | | | |
| E-400 [3] | | | | 1.1 | | | | | | | | | |
| E-600 [4] | | | | | 1.1 | | | | | | | | |
| E-4000 [5] | | | | | | | | | | | | | 1.1 |
| Propylene glycol | | | | | | | 1.1 | | 0.8 | 0.8 | 1.1 | 1.1 | |
| P-2000 [6] | | | | | | | | 1.1 | | | | | |
| 4,4'-isopropylidene-bis (2,6-dibromophenol) | | | | | | | | | 0.4 | | | | |
| Diethylene glycol | | | | | | | | | | | | | |
| Ethylenimine | 1.00 | 1.35 | 1.35 | 1.35 | 1.35 | 1.35 | | 1.35 | 1.35 | 1.35 | 1.35 | 1.35 | 1.35 |
| Propylenimine | | | | | | | 1.35 | | | | | | |

[1] A dimerized fatty acid sold by Emery Industries.
[2] Polyethylene glycol of molecular weight 200.
[3] Polyethylene glycol of molecular weight 400.
[4] Polyethylene glycol of molecular weight 600.
[5] Polyethylene glycol of molecular weight 4,000.
[6] Polypropylene glycol of molecular weight 2,000.

In practice, the water-soluble cross-linked polyesters are used as flocculants by adding them through conventional means to aqueous substrates containing the solids to be settled. The amount of the cross-linked polyester added will, of course, depend on the amount of solids present in the water and the increase in settling rate which is desired. Preferably, for substrates containing about 5 g. of solids per 100 ml. of water, from about 2 to 16 p.p.m. of the cross-linked polyester is used. If less than 2 p.p.m. is added, the settling rate is too low. Using over 16 p.p.m. will not produce undesirable results, but larger amounts are uneconomical in comparison to the results obtained. For accuracy in measuring the amounts of the cross-linked polyester added, the aqueous solution of the cross-linked polyester obtained after heating may be diluted to about 0.05 weight percent in water and the dilute solution injected into the substrate with a hypodermic needle.

The invention is illustrated by the following specific examples which are to be regarded as embodying preferred practice of the invention. The invention is to be limited only by the scope of the appended claims.

Example 1

Table I summarizes the production of a series of aziridinyl resins of the type useful in preparing the water-soluble, cross-linked polyesters of the present invention.

Example 2

The resins shown in Table I were cross linked under the conditions specified in Table II, pursuant to the procedure described hereinbefore. Table II shows the effect on the settling rate of illite silica of azeridinyl polyesters cross linked for different times and in different concentrations in the water solution. The illite silica solution was prepared by introducing 5 g. of the silica to a 100 ml. graduated, glass stoppered cylinder and adding water to the 100 ml. mark. The silica was dispersed by gentle agitation and allowed to soak for at least 30 minutes and less than 8 hours. A sufficient amount of a 0.05 percent by weight solution of the cross-linked polyester in water was added to the substrate to give the concentrations in parts per million listed in the table, followed by gentle agitation. The subsidence time of the floc interface was measured between the 90 ml. and the 50 ml. mark on the cylinder. This gave the settling rates, which are expressed in inches per minute.

TABLE II

| | Amount of polyester in water, wt. percent | Cross linking time, hours | Cross linking temp., °C. | Flocculation ||||
|---|---|---|---|---|---|---|---|
| | | | | Amount Cross-Linked Polyester Added, p.p.m. ||||
| | | | | 4 | 5 | 8 | 10 | 16 |
| | | | | Settling Rate of Illite Silica, 5 g./100 ml., in./min. ||||
| Polyester No.: | | | | | | | | |
| 1 | 5 | 1 | 50 | 0.61 | | 0.6 | | 1.5 |
| 1 | 20 | 1 | 50 | 3.3 | | 6.5 | | 5.9 |
| 2 | 5 | 2 | 50 | | 3.7 | | 5.6 | |
| 2 | 20 | 2 | 50 | | 4.0 | | 7.1 | |
| 2 | 40 | 0.5 | 25 | 2.3 | | 3.4 | | 3.5 |
| 2 | 40 | 1.0 | 25 | 1.9 | | 1.9 | | 3.4 |
| 2 | 40 | 2.5 | 25 | 2.6 | | 3.7 | | 4.5 |
| 2 | 40 | 3.5 | 25 | 4.7 | | 5.3 | | 4.7 |
| 2 | 40 | 4.5 | 25 | 4.2 | | 5.9 | | 5.2 |

Example 3

The settling rates for minco bond clay and taconite were evaluated according to the precedure of Example 2, using polyester No. 1, cross linked for 1 hour at 50° C. in 20 weight percent aqueous solution, as the flocculant. Table III shows the settling rates for the two substrates evaluated.

TABLE III

| | Amount Cross-Linked Polyester Used, p.p.m. | | | |
|---|---|---|---|---|
| | 8 | 24 | 32 | 36 | 44 |
| Substrate | Settling Rate, in./min. | | | | |
| Minco bond clay | | | 2.09 | 4.98 | 5.06 |
| Taconite | 6.5 | 5.25 | 5.75 | | |

Example 4

The settling rates of a substrate containing 5 grams of illite silica per 100 ml. water were evaluated using cross-linked polyesters prepared from the polyesters listed in Table I. In each case, the polyesters were cross linked in a water solution containing 5–25 weight percent polyester by heating from 25° to 50° C. for a time of from 30 minutes to 2 hours, as shown in Table IV. The results are shown in Table IV, with the settling times expressed in inches per minute. The amount of cross-linked polyester added is shown in parts per million. A substrate containing 5 grams of illite silica per 100 ml. of water, to which no cross-linked polyester was added, gave a settling rate of 0.3 inch per minute.

What is claimed is:

1. A process for preparing a water-soluble, cross-linked polyester containing alkylenepolyamine groups, which comprises heating a water solution of a polymeric polyester having a plurality of 1-aziridinyl groups obtained as a reaction product of an aziridine compound having an active hydrogen on the nitrogen atom and a polymeric polyester having olefinic double bonds which are adjacent to carboxy groups, said heating being carried out for a time sufficient to cause cross linking by forming alkylenepolyamine groups from said 1-aziridinyl groups.

2. The process of claim 1 in which the aqueous solution contains from about 5 weight percent to about 40 weight percent of said polyester, and is heated to a temperature of from about 25° C. to about 50° C., for a time of from about ½ hour to about 4½ hours.

3. The process of claim 1 wherein the heating is carried out in the presence of an acid catalyst.

4. The process of claim 3 wherein the acid catalyst is hydrochloric acid.

5. A water-soluble, cross-linked polyester prepared by the process of claim 1.

TABLE IV

[Settling Rate on Illite Silica, 5 g./100 ml.]

| Polyester No.: | Cross linking time | Cross linking temp., °C. | Cross linking conc. in aq. soln. percent by wt. | In./min. 0.5 p.p.m. | In./min. 1.0 p.p.m. | In./min. 4.0 p.p.m. | In./min. 5.0 p.p.m. | In./min. 8.0 p.p.m. | In./min. 10.0 p.p.m. |
|---|---|---|---|---|---|---|---|---|---|
| 1 | 1 hour | 50 | 20 | 0.8 | 2.3 | 3.3 | | 6.5 | |
| 2 | 2 hours | 50 | 20 | | | | 4.0 | | 7.1 |
| 3 | 30 minutes [1] | 25 | 25 | | | | 0.4 | | 0.5 |
| 4 | do.[1] | 25 | 25 | | | | 0.4 | | 0.4 |
| 5 | do.[1] | 25 | 25 | | | | 0.4 | | 0.5 |
| 6 | 1 hour | 25 | 12 | | | 0.7 | | 0.9 | |
| 7 | do | 25 | 14.5 | | | 0.5 | | 0.6 | |
| 8 | do | 50 | 10 | | | | 1.6 | | 1.6 |
| 9 | do | 25 | 10.6 | | | 0.7 | | 1.21 | |
| 10 | do | 50 | 10 | | | | 0.4 | | 0.4 |
| 11 | do | 25 | 10.5 | | | 1.3 | | 1.0 | |
| 12 | do | 25 | 9 | | | 0.5 | | 0.8 | |
| 13 | do | 50 | 10 | | | | 1.3 | | 2.0 |

[1] Hydrochloric acid catalyst.

References Cited

UNITED STATES PATENTS 2,626,931   1/1953   Bestian _____ 260—2

WILLIAM H. SHORT, Primary Examiner

E. NIELSEN, Assistant Examiner